Sept. 25, 1923.
M. ROSEN
1,468,835
CUSHIONING DEVICE FOR THE HANDLE BARS OF MOTOR CYCLES, BICYCLES, AND LIKE VEHICLES EMPLOYING HANDLE BARS
Filed April 6, 1922
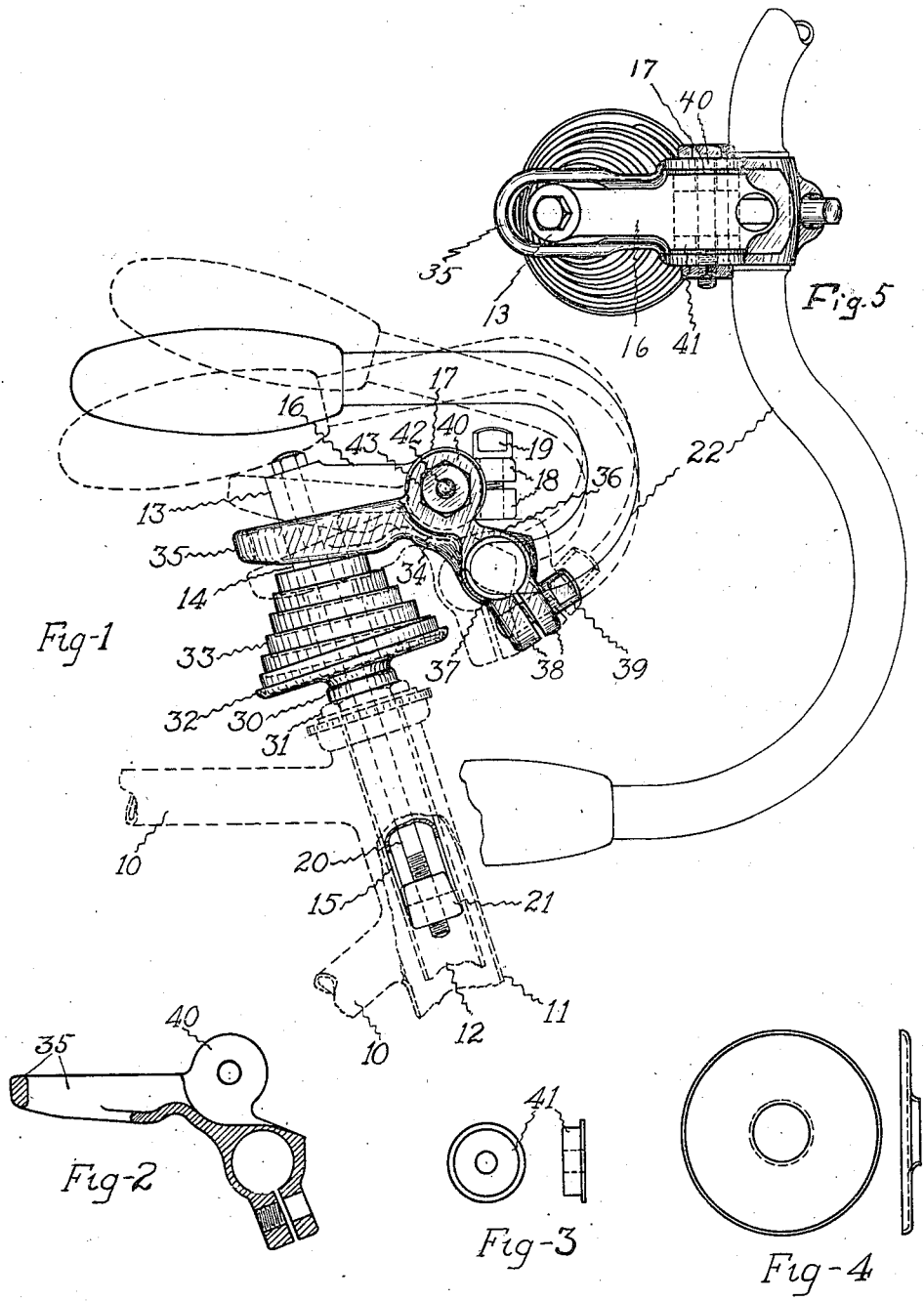

Patented Sept. 25, 1923.

1,468,835

UNITED STATES PATENT OFFICE.

MEYER ROSEN, OF BLOOMINGTON, ILLINOIS, ASSIGNOR TO THE CUSHION HANDLE BAR CO., OF BLOOMINGTON, ILLINOIS.

CUSHIONING DEVICE FOR THE HANDLE BARS OF MOTOR CYCLES, BICYCLES, AND LIKE VEHICLES EMPLOYING HANDLE BARS.

Application filed April 6, 1922. Serial No. 549,975.

*To all whom it may concern:*

Be it known that MEYER ROSEN, a citizen of the United States of America, residing at 1023 Folsom St., Bloomington, in the county of McLean and State of Illinois, has invented certain new and useful Improvements in Cushioning Devices for the Handle Bars of Motor Cycles, Bicycles, and like Vehicles Employing Handle Bars, of which the following is a specification.

This invention relates to a cushioning device for the handle bars of motorcycles, bicycles and like vehicles employing handle bars.

The invention has special reference to details of structure and relative arrangement of parts that have a distinct functioning advantage over similar devices previously employed for like purposes.

The invention relates specifically to the manner of relating a rocker member to which the handle bars are attached to a head member adapted to be fixed to the steering post of the forward wheel of the vehicle to which it is attached; to the provision of a volute spring bar and the relationing of the same for support and co-action respectively with the steering wheel post and the rocker member whereby through the employment of such spring and the detailed relationing of parts, wider latitude of vertical movement of the rocker member is made possible and under a more uniform tensioning than is possible in connection with the employment of coil springs that have heretofore been in use for a similar purpose, resulting in a softer cushioning action to the relief of the rider and also functioning to minimize to the last degree the wabbling tendency of the vehicle wheel that usually attends excessive jars.

The invention also includes details of construction and special combinations of parts hereinafter more particularly described.

Referring to the drawings, Figure 1, is a side elevation showing my device attached to a vehicle with a part broken away to show interior structure utilized for fixing the stem portion of a head member to the steering post of the vehicle and also showing in solid and dotted lines several relative positionings of the rocker member and handle bars.

Figure 2, is a detail side view of a rocker member.

Figure 3, shows in plan and side elevation the structure of a spacing bearing designed for relationing a centering or pivoting pin between a head and rocker member with said head member.

Figure 4, is a view in plan and side elevation of a flanged seat to be relationed to the stem portion of a vehicle post and utilized as a seat for the volute spring.

Fig. 5 is a plan view partly in section, to the right of Fig. 1.

Referring to the drawings, 10 refers generally to a diagrammatic showing of a bicycle frame and 11 to the front fork of the same. 12 is the ordinary and usual steering post of the motorcycle and similar handle bar bearing vehicles. 13 refers generally to a bicycle head. 14 to the stem portion of said head which has the ordinary and usual slotted fashioning as at 15 in the lower portion thereof and 16 is the forwardly extending portion of said head having the ordinary and usual circular seating portion 17 for the handle bars and the relatively spacing lug portions 18 thereon to accommodate variable spacing by means of a set screw as 19 to secure the handle bars of varying respective diameters within the seat in the head. 20 is a bolt associated in the usual way with the head and the stem portion thereof and in association with a wedge nut 21 adapted for seating in the slotted end of said stem whereby the wedge member may be drawn into the end of the stem for the purpose of expanding it to effect a permanent relationing of said stem with the bicycle post whereby turning of the stem through the movement of the head member will effect a corresponding turning of the steering post member. 22 are the ordinary and usual handle bars employed in connection with vehicles of the class above indicated.

So far I have only described parts which are standard with vehicles of the class indicated. Referring now to mechanism constituting my present invention 30 is a spacing or washer member supported upon the closure cap 31 of the ball bearing housing that is commonly in use in vehicles of this class. 32 is a flanged seating member associated with the stem portion of the bicycle head and supported upon washer member 30. 33 is a volute or flat metallic spring coiled in a spiral conical form (compressible in the direction of its axis) said spring being seated at its base in seating member 32. 34 refers generally to a rocker member, the same comprising rearward longitudinally slotted reach portion 35 adapted, through its slotted portion to embrace the stem portion of the head member 13 and for bearing relation upon the upper or apex portion of the volute spring member 33; the forwardly and downwardly projecting handle bar supporting member 36 fashioned with the circular seat 37 and spaced lug members 38 adapted to support handle bars through the clamping action of set screw 39 applied to lug members 38. Said rocker member also includes the centrally disposed laterally extending members 40 spaced apart and provided with lined perforations adapting said rocker member to be pivotally related to the head member 13. However, in relating my cushioning attachment to the standard head of a motorcycle and vehicles of a like class, the circular opening as 17 in such heads is adopted as a centering seat for the pivotal connection between reach 16 of said head and my rocker member 35, but to utilize seat 17 for this purpose however it is necessary that the spaced flanged bushings as 41 be interposed as a filler for the handle bar space, said bushings being provided with perforations alining respectively and also with the perforations in members 40 of the rocker member 34. In relating the rocker member to the head member the slotted reach portion of the rocker member is caused to embrace stem 14 of the head, bushings 41 are seated in the opening 17 in normal handle bar seat of said head. Then set screw 19 is operated to effect impingement and holding of said bushings firmly in place. Then the bolt as 42 is entered through the alining perforations of the associated parts and a nut 43 is applied to complete and maintain such union of parts whereby a pivotal relation is established between the head and the rocking member.

In the normal relationing of parts reach member 35 of the rocker member is held in contact with the member 16 of the head but when the vehicle is in use and the rider applies weight to the handle bars the rocker member will be actuated to depress reach portion 35 thereof under the resistance of the volute spring 33 resulting in a cushioning action against vibrations, said cushioning action being rendered specially effective tends to minimize shocks and jars to the last degree because of the capability of the volute spring to be depressed substantially to the point of support of its lowest portion without injury to the spring or its parts and with a comparatively small degree of variable pressure as compared with the action of ordinary compressible coil springs.

The general functioning purposes of the device herein is so well known and the proceeding description has been so completely detailed as to parts and improvements, their co-relationing and functioning, that it is not thought that further detailed description of the operation of the device is necessary.

I have shown herein the preferred form of embodiment of my invention. However, form and arrangement of parts may be varied and a perfectly operable and usable device be provided and therefore, I do not desire to be limited to form or details as herein disclosed but claim all forms and detailed constructions that embody the principles of disclosure herein made.

It will be noticed that my spring member 33 is not enclosed and I have made it so purposely that other springs of varied tension may be interchangeable therewith.

There is an obvious result in this that a spring of suitable tension for the rider may be replaced without having to alter, in any way, the bicycle.

What I claim is:

1. In a device of the class described, in combination, a standard head member comprising a stem adapted to be permanently related to a steering post and a handle bar of cushioning means for the latter comprising a rocker member provided with a rearwardly extending slotted portion adapted to embrace the stem of the head member and a forwardly extending portion fashioned with a circular seat and co-acting jaw members to facilitate the support of the handle bars, means for actuating the jaw members for fixing the handle bar in said seat, said rocker member being provided with laterally extending relatively spaced and perforated attachment members, perforated bushing members associated with the handle bar opening in the head member, a bolt and nut member for pivotally relating the attachment members of the rocker member to the bushing members of the head, a supporting member related to the stem portion of the head member and a resilient member interposed between said support and the rearwardly extending member of the rocker member.

2. In a device of the class described, in combination, a standard head member, comprising a stem and a forwardly extending member, fashioned at its outward portion with a handle bar supporting seat, a rocker member fashioned with a pivoted seat intermediate its ends and provided with a rearwardly extending slotted portion to embrace the stem member and a portion extending forwardly of the pivot center fashioned at its outward end with a handle bar seat and means for pivoting the rocker member within the normal handle bar seat of the forwardly extending portion of the head member and a suitably supported resilient member adapted normally to hold the slotted portion of the rocker member in contact with the forwardly extending portion of the head member.

3. In a device of the class described, in combination, a post member, an arm on said post provided with a pivot seat, a rockable member fashioned with a pivoting portion intermediate its ends, the rear end of said member being slotted to embrace the post member and the forward end thereof fashioned to engage a handle bar, means for pivoting the rockable member upon the arm and a resilient member suitably supported and related to the rockable member to normally hold it in elevated position, from which it may be rocked when force is applied to the handle bars.

4. In a device of the class described, in combination, a front fork of a bicycle, a bolt member fixed therein, an arm member fixed to the upper end of the bolt, its forward end being provided with a pivot seat, a rockable member fashioned intermediate its end with a pivot seat, the rearward portion from said seat being slotted to embrace the bolt member and its forward portion fashioned with a handle bar seat, means for pivoting the rockable member to the arm member and a resilient member interposed between the slotted end portion of the rockable member and the fork.

In testimony whereof I affix my signature.

MEYER ROSEN.